INVENTOR.
Daniel Silverman.

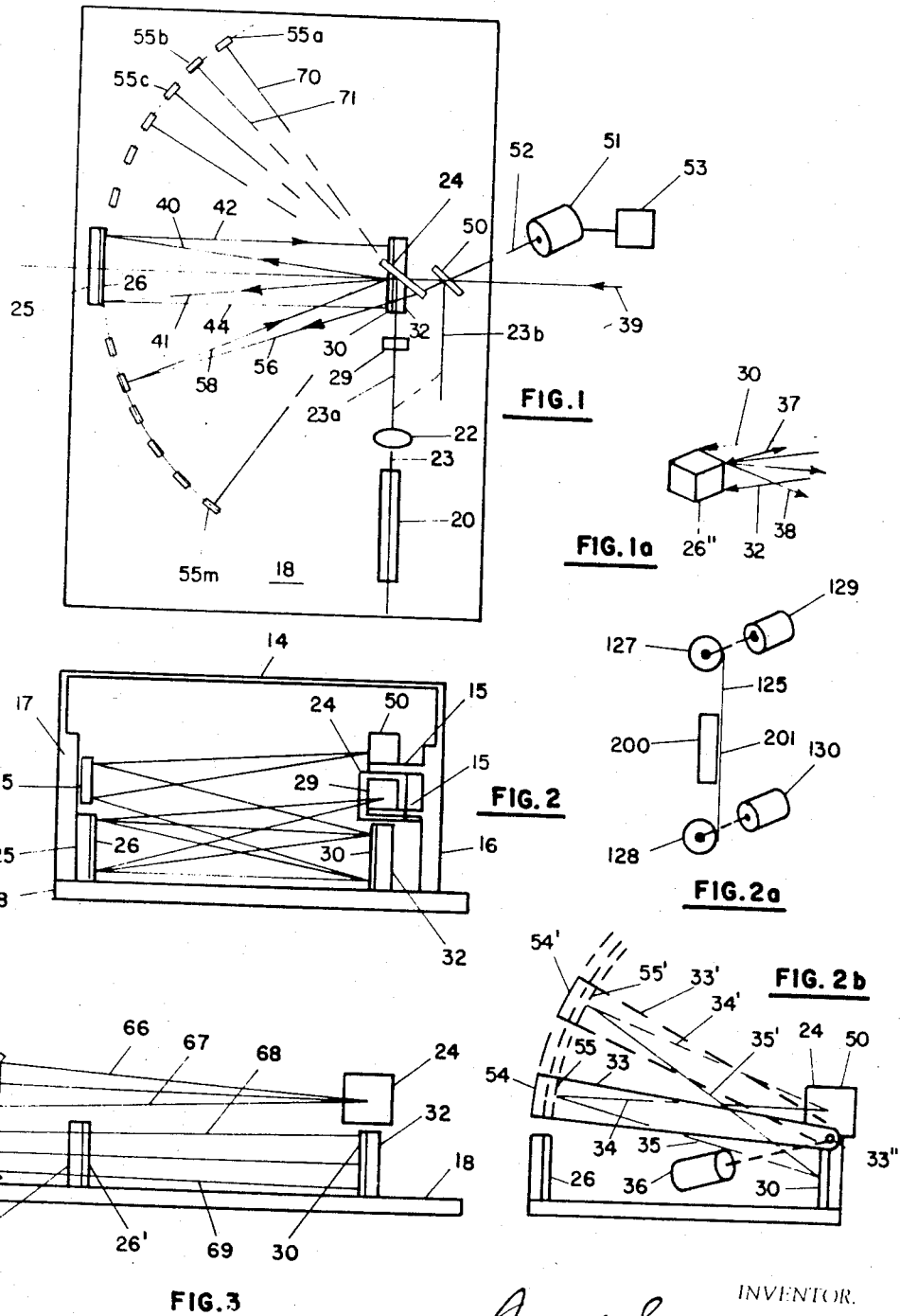
Feb. 2, 1971   D. SILVERMAN ET AL   3,560,072
SYSTEM FOR THE STORAGE, RETRIEVAL AND DISPLAY OF INFORMATION
Filed April 17, 1968   3 Sheets-Sheet 1
INVENTOR.
Daniel Silverman

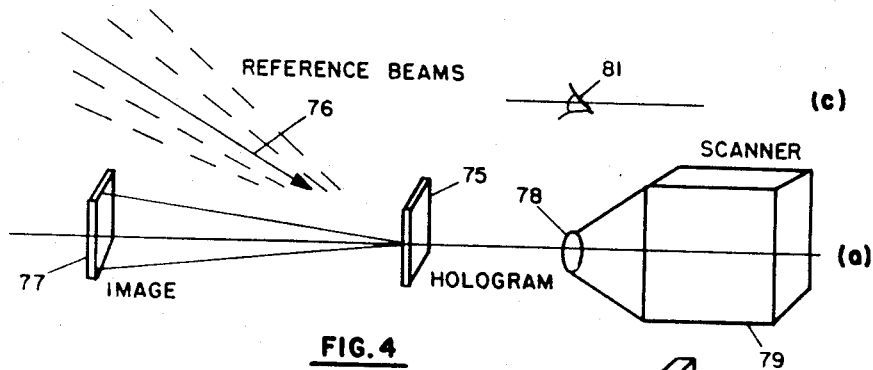
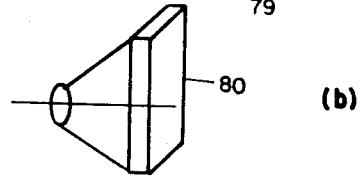
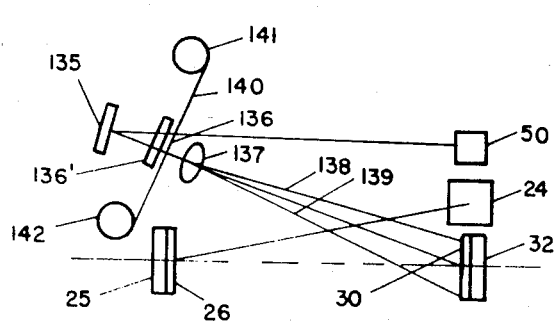
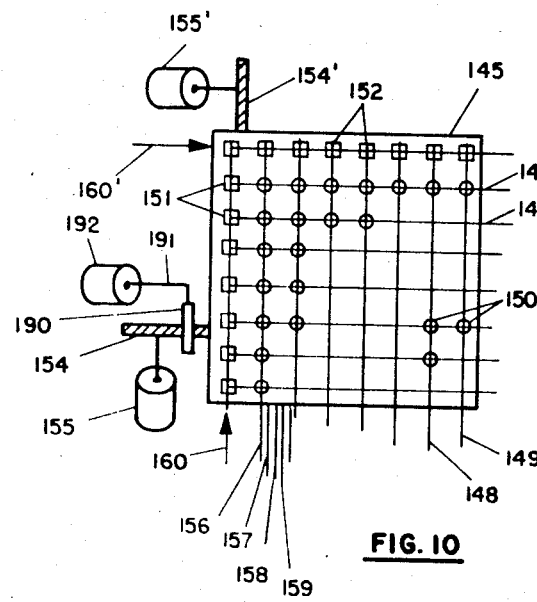
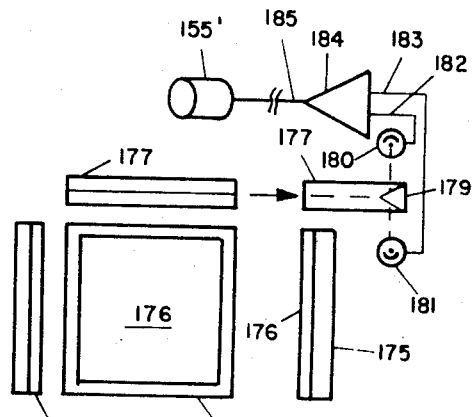

United States Patent Office 3,560,072
Patented Feb. 2, 1971

3,560,072
SYSTEM FOR THE STORAGE, RETRIEVAL AND
DISPLAY OF INFORMATION
Daniel Silverman, 5969 S. Birmingham St.,
Tulsa, Okla. 74105
Continuation-in-part of application Ser. No. 612,698,
Jan. 30, 1967. This application Apr. 17, 1968, Ser.
No. 721,998
Int. Cl. G02b 27/22
U.S. Cl. 350—3.5    19 Claims

ABSTRACT OF THE DISCLOSURE

This invention is concerned with an information storage and retrieval system capable of storing information in the form of microreproductions of pictorial or alphanumeric information or information in digital form. Information in the form of patterns of areas of different color, grayness, or degrees of transparency are recorded on a photographic medium as multiple holographic, exposures. Each exposure is made with a reference beam of coherent light of different intensity patterns, or of uniform intensity, but different direction with respect to the recording film. The same reference beams are used to reconstruct the recorded images as were used to record them. The reconstructed images can be utilized by direct viewing, by photographic copying or by photoelectric scanning. Means are provided, including patterns or guide indicia, on the subject record and the means to vary the intensity of the reference beams, so that, with the help of servo means responsive to these sets of guide indicia, the subject records and the patterns of the reference beam can be precisely positioned with respect to the holographic film. In preparing the hologram, a pattern of guide indicia is recorded on the film to facilitate the replacement of the developed film to the precise position occupied by the film during the recording process.

---

This application is a continuation-in-part of my copending application, Ser. No. 612,698, filed Jan. 30, 1967, entitled, "Information System Using Arrays of Multiple Spot Patterns."

This invention is concerned with the storage of information at high storage density and the rapid retrieval of this information with minimum error, and for its rapid display. More particularly it is concerned with the storage of information on radiation sensitive media in the form of multiple exposure holograms, any one of which can be reconstructed, viewed or otherwise utilized at will.

In the prior art, the storage of information on film at high density has generally been in the form of reduced scale replicas or microreproductions, or in the form of patterns of spots each of which spots comprise units, or bits, of information. With present day commercial films and their high resolution capabilities, it is possible to create very high density patterns of spots, such as $10^6$ or more spots per square inch. There is still a weakness in such systems, however, and this concerns the effect of blemishes in the film, or dust or dirt particles on the film. If these obscure one or more of the spots or bits, they have removed the information in those spots, which cannot be retrieved, and are thus lost.

In this invention the information, be it a pattern of spots or a microfacsimile, is stored on the film in the form of a hologram, which is a compex diffraction pattern of light and dark spaces representing the information. It is a characteristic of a hologram that each small area of the hologram contains information about the entire subject, or in other words, an image of the subject can be reconstructed from the entire hologram, or from any part of it. Therefore, if part of the hologram is obscured by a blemish in the film, or by superposed dust or dirt particles, the image of the subject can still be reconstructed from the remainder of the hologram. Of course, something is lost, which is the "quality" of the image, or its resolution. However, all of the information in the subject will be present in the reconstructed image.

I propose to further increase the storage density of information on the film record, by multiple-exposing the film with successive subjects in such a way that images of any one of the separate subjects can be reconstructed at will without interference from any of the other subjects recorded on the film record.

It is therefore an important object of this invention to create an information system in which the information record has a low susceptibility to dust, dirt and blemishes, to the end that a minimum of information is lost due to these causes. It is a further object to increase the storage density by superimposing multiple holographic images on the film, any one of which can be withdrawn from storage and displayed independently of the others. It is a further object to display the information for machine readout and/or visual examination.

It is a further object of this invention to provide means for precisely relatively positioning the subject, the reference beam and the holographic film so that the image of a spot pattern subject will be displayed in a predetermined position to facilitate scanning the spot pattern.

It is a further object of this invention to provide means to synchronously change from one reference beam to another as the hologram film is traversed from one exposure frame to another.

These and other objects and details of this invention will be understood more clearly from the following description when taken in connection with the accompanying drawings, showing by way of examples, several embodiments of the invention. Referring now to the drawings:

FIGS. 1 and 2 show two views of one embodiment of this invention in which the plurality of reference beams reach the hologram film from different directions. FIGS. 1a, 2a and 2b show additional details.

FIG. 3 shows an embodiment in which the subject is a transparency and is illuminated by back lighting.

FIGS. 4a, 4b and 4c show how the recorded image is reconstructed and how the image is utilized.

FIG. 9 illustrates an embodiment in which the plurality of reference beams have different patterns of intensity.

FIG. 10 illustrates one embodiment of a subject card utilizing a pattern of information spots and a pattern of guide indicia.

FIG. 11 illustrates an optical servo means for relatively positioning the subject card of FIG. 10 and the hologram positioning means.

Figure 7:
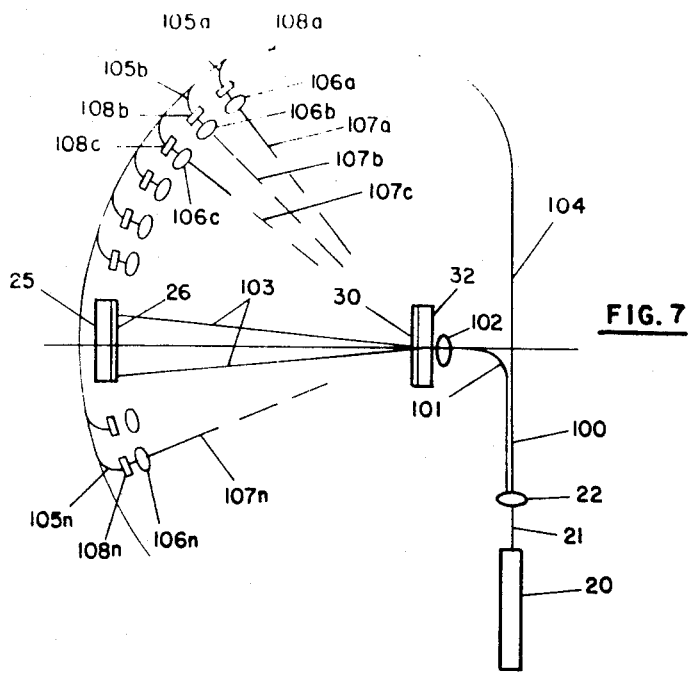
FIG. 7 shows an alternative embodiment to that of FIG. 1 utilizing fiber optics.

Referring now to the figures, and particularly to FIGS. 1 and 2, I show in plan and elevation respectively, one embodiment of an apparatus for recording holographic information on a film, and for reading out, or reconstructing images of the holographic information. In FIG. 1 numeral 20 represents a source of intense coherent light. This is preferably a laser of the continuous or pulsed types, which are well known in the art and their use in the preparation of holograms has been well publicized. For convenience, the apparatus will be discussed in terms of a continuous gas laser. No detailed explanation of the use of lasers in the making and reading of holographs will be given. There has been adequate publication of this art, and the reader is referred to the many articles and books in the literature, such as the article by E. N. Leith and J. Upatnieks published in the Journal of the Optical Soc. Amer., vol. 53, #12, p. 1372 (1963).

The laser beam 21 is modified by optics 22 to form a beam 23 (23a, 23b) which is deflected by mirror 24 to irradiate the subject, or information 26, that is to be recorded. This subject can be a plane diagram, picture, pattern of spots of light and dark, or colors, a transparency, or a three dimensional solid object, etc. In FIG. 1 I show an opaque, front lighted plane subject. In FIG. 1a I show a three dimensional object 26'', and in FIG. 3 I show a back lighted transparency 26'. The subject 26 is positioned in a subject positioning or mounting means 25.

In FIGS. 1 and 2 the rays 40 and 41 from mirror 24 flood the subject and part of this radiation is reflected and scattered, and generally redirected back 42, 44 to the film 30, on which the hologram is to be recorded. This film must, of course, be sensitive to the radiation from the source 20. The mirror 24 may be mounted above and centered over the film 30, although its position is not too critical.

Above the mirror 24 is another mirror 50 rotatable about a vertical axis. In FIG. 1 it is shown for clarity, displaced to the right, although in FIG. 2 it is shown in its optimum position centered over the plane of the film and over the centerline of the film 30. This mirror receives part 23b of the radiation of the beam 23, and reflects it to one or another of the plurality of mirrors 55a, 55b, 55c, 55n, etc. These are arranged in a horizontal plane with their surfaces substantially perpendicular to the radii to the center of the film. Thus, as the mirror 50 is turned by motor 51, drive 52, and control 53, light from beam 23 is sent to a mirror 55 by ray 56, for example, and returned to film 30 by ray 58, FIG. 2. Thus by turning mirror 50 appropriately, light from laser 20 can be made to irradiate film 30 from any desired one of the directions such as 70, 71, etc., provided by the plurality of mirrors 55.

Now, in the holographic process, it is necessary, in order to record a hologram, to receive light at the film from the irradiated subject *and* simultaneously from a reference beam, preferably at a different angle to the film than that from the subject. The radiation in the reference beam and from the subject should come from the small coherent source 20, however. The light reaching the film 30 by way of mirrors 50 and 55 constitute the reference beams.

Once a hologram is recorded on the film by exposing it simultaneously to the light from the subject and to a reference beam from a different angle, such as 70, for example. The film can then be developed and replaced in its original position. The film 30 would normally be held in a hologram mounting of positioning means 32, so that the developed film can be precisely repositioned to its original position. Then when the light to mirror 24 is blocked by mask 29, and light from source 20 is directed to mirrors 50, 55 and back to the developed film 30, the image of subject 26 will be seen in the same position as originally occupied by the subject 26, if the eye is directed along direction 39. The line 39 connecting hologram and subject can be called the subject line.

Of course, a camera can be directed along direction 39 instead of the eye and it can record the image of the subject 26. The resulting picture recorded by the camera can be read, to retrieve the detailed information. Or, any one of the many types of scanners described in the art can be used to read or scan the image to retrieve the detailed information from the image.

Now, starting with a fresh unexposed film 30, and a subject 26a, the mirror 50 is turned to utilize mirror 55a and a first hologram 30a is recorded. Without moving the film 30 a second subject 26b is placed at position 26, and mirror 50 is rotated to utilize mirror 55b, and a second exposure or second hologram is recorded. In this manner as many separate exposures can be made as there are possible distinct or separate angle 70, 71, etc., of the reference beams. Although one might conceive of a very great many angles and thus separate exposures, for practical purposes there is a limit to avoid crosstalk, although as many as 10 to 15 or more separate exposures on the same film are possible. When the multiple-exposed film 30 is developed and replaced into its original position, any one of the plurality of recorded images can be reconstructed by shutting off beam 23a and using beam 23b, and turning the mirror 50 to the desired mirror 55.

In FIG. 3 I show the mirror 24 directing its rays 66, 67 over the subject 26' (which in this case might be a transparency of a microfilm or a spot pattern) to mirrors 64, 65, where it is directed to the back surface of the subject 26'. This backlighted transparency 26' is now the subject, and the light diffracted by the transparency and redirected to the film 30 is combined with the reference beam from mirrors 50 and 55, to form the hologram.

It will be clear that the various optical elements, such as lenses, mirrors, films, etc., should be rigidly mounted to a base and frame shown schematically as 18, 17, 16, 15, etc., but well understood in the art, and should be enclosed in a light-tight case or housing, such as 14, etc.

The film 30 can be one of a series of separate chips of film, or it can be one of a plurality of separate frames on a strip film. Such a strip film system is illustrated in FIG. 2a where the film 125 is reeled on two reels 127, 128 and passes through a film gate 200, exposing a frame 201 of film. The film can be traversed by means of motors 129, 130 as is well known in the art. Precise means (not shown) for positioning the frame 201 in the film gate or hologram mounting means 200 will be described in connection with FIGS. 10 and 11.

It will be clear also that this film strip system of FIG. 2a can be used in place of the subject record 26, where any one of the frames on the proper film strip 125 can be presented as the subject to be recorded on the hologram film. These can of course be displayed by front lighting or back lighting as shown in FIGS. 1, 2 and 3.

I contemplate that the reconstructed images can be utilized in many ways, such as, (a) Photographically copied, to be (1) scanned by a machine, (2) read visually, (b) Scanned by machine directly, to read the information, or (c) Visually displayed.

FIG. 4 illustrates how the multiple exposure hologram is used in the image reconstruction, and how the reconstruced images are utilized. Numeral 75 represents the developed hologram. The reconstruction irradiated coherent beam 76, arriving at one of many different discrete angles, unlocks and reconstructs the particular image that was recorded with that particular reference beam angle. The resulting reconstructed image is shown schematically at 77. This can be seen by placing the eye 81 at position 78 on the axis of the hologram. If desired, a camera 80 can be placed at 78 to record the image 77. Or a photo-optical scanner 79, such as is well known in the art can be placed at 78 to scan or read the pattern of spots in the hologram image.

As is well known in the art of optical holography, when the hologram is reconstructed by irradiation by the reference beam, two images will be formed. One of these is the virtual image behind the hologram, such as is illustrated in FIG. 4. The other image is a real image where the light from the reference beam is diffracted by the hologram and brought to a focus in front of the hologram. A photographic film placed in the plane of the real image will record this image of the subject.

Figure 5:
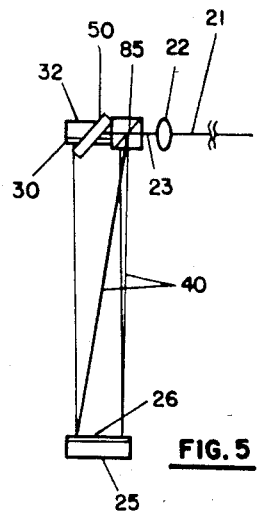
FIG. 5 shows an alternative optical system to that of FIG. 1.

In FIG. 2 I show the mirror 24 and the movable mirror 50 separated one above each other. Optically, it may be more convenient to have the two mirrors in-line along the direction of the laser beam 23. As shown in FIG. 5 this is accomplished by using instead of mirror 24, a partially silvered mirror or beam splitter 85. Thus the beam 23 enters the beam splitter 85. Part of the radiation is reflected 40 to subject 26. The remainder passes on through to the mirror 50 by means of which it is reflected to the mirrors 55.

In FIG. 1 I show the hologram as a single chip of film 30. However, if a large amount of data are to be stored, calling for many frames, it becomes convenient to use a long strip of film 125 as in FIG. 2a and to record separate frames along the length of the film.

Figure 6:
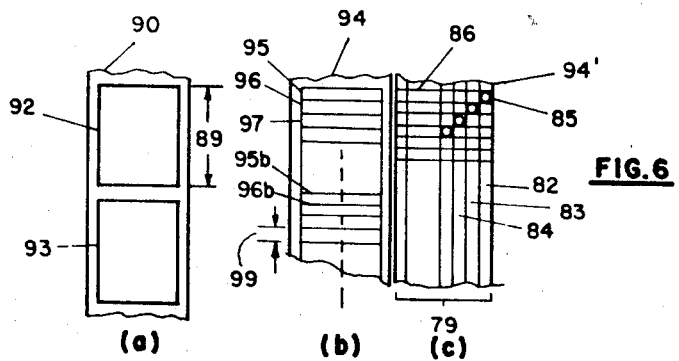
FIGS. 6a, 6b and 6c show alternative embodiments of the hologram film.

Since a plurality of exposures are to be made, these can be made successively without moving the film, so that all of them will occupy the same space. This is illustrated in FIG. 6a by frames 92, 93 of film 90. On the other hand, if desired, as in FIG. 6b, the film can be shifted intermittently between exposures by a distance 99 which is a fraction of the frame length 89. This fraction will preferably be equal to $1/n$, where $n$ is the number of superimposed exposures on the film. Numerals 95, 96, 97 represent the tops of successive frames, while 95b, 96b, 97b represent the bottoms of the corresponding frames.

In FIG. 6c I show a modified form of film 94' to be used as a part of film 94 or as a separate film which carries the same frames 95, 96, 97, etc., as strip 94. It has an opaque section 79 carrying longitudinal strips 82, 83, 84, etc. A punched out or otherwise transparent or translucent area or spot 85 is placed in one or another of the strips 82, 83, 84 at a longitudinal position corresponding to each frame 95, 96, 97, etc. Thus, the horizontal and longitudinal position of each spot 85 is indicative of the particular frame to which it corresponds. Now, if this strip 94' is placed in the position of film 30 and if light from beam 23 can be impressed on area 86, light will pass through each of the spots 85 in turn. Light from the spot in column 82 can be directed to mirror 55a, for example (such as by mirrors or optical fibers), from which it is reflected to the frame 95, for example. Similarly, as the strip film 94' is advanced to the next frame 96, the next spot in column 83 is in the area 86 and receives light from 23 and passes it on to mirror 55b and back to frame 96, and so on. Thus, as the strip moves along, new spots 85 in 82, 83, 84, etc., are presented which control the illumination of the holograms on strip 94' by choosing automatically the proper reference beam to record and/or reconstruct the holograms.

If the portion 79 of the film 94' is prepared beforehand, with transparent spots in the proper positions, and if illuminated portion 86 is shielded from the unexposed film 95, etc., then the holograms can be recorded by controlling the particular reference beam (such as from mirrors 55) by passing the laser beam through the particular spot corresponding to the hologram frame being recorded. When prepared in this way, and the film developed, the plurality of holograms can be reconstructed sequentially by simply directing the beam 23 to area 86 and drawing the film strip through the hologram mounting means 32. This could be done quite rapidly, creating the illusion of a three dimensional moving picture.

While I prefer to have the control portion 94' of the film strip with its columns 79 as part of the hologram film 94 itself, it is clear that the control portion 79 can be on a separate film strip from the hologram frames 95, 96, 97, etc., provided the two strips are traversed in synchronism, by means that are well known in the art. Of course, other means, equivalent to the perforated strip 94' can be used, when driven synchronously with the film 94 to control the reference beams. For example, the motor 51 of FIG. 1, positioning the mirror 50 can be driven in accordance with motors 129, 130 of FIG. 2a, so that as the film 125 is moved to expose new frames, the mirror 50 is turned to a different mirror 55 to form a different reference beam.

In describing the apparatus of FIGS. 1 and 2 I have shown that they are purely schematic diagrams and show the essentials of the apparatus. However, to indicate that all the elements described are part of a complete system, and furthermore to indicate that all of the optical parts should be mounted rigidly with respect to each other I have schematically indicated a framework comprising a base 18, uprights 17 and 16 and brackets 15, etc., to hold the individual elements in proper position. Also, a housing or light shield 14 is required, particularly for the recording operation, to restrict the radiation falling on the film 30 to that from the object 26 and the reference beam. Of course, for the readout, reconstruction, or display of the hologram images, the illumination of the subject is cut off such as by the mask 29, and the reference beam alone is used. The housing 14 can be closed or open. However, if the reconstructed image is to be photographed or scanned it would still be desirable to keep the case 14 closed. It will be clear that if the instrument is to be used in a closed dark room, then the housing 14 would not be required. Also, while a laser beam is desired for the recording operation, it is not necessary to have such an intense illumination for reconstruction, and one or the other of several commercial (reasonably monochromatic light sources can be used for reconstruction, at least for visual observation.

In FIGS. 1 and 2, I show how a plurality of mirrors 55 can be mounted in a circular frame with each mirror directed in the proper angle to reflect back to film 30 light that reaches it from mirror 50. I have described the mirrors 55 mounted in a horizontal plane. In FIG. 2b, I show schematically a part of FIG. 2. In addition I show the mirror 55 mounted on a frame 54. The frame 54 is a circular frame carrying all of the mirrors 55. Frame 54 is supported by two radial arms 33 that are pivoted on a horizontal axis 33''. By means such as the motor 36 the arms 33 can be rotated to position 33' carrying the frame 54 and mirrors 55 to positions 54' and 55'. Thus a plurality K of positions of the frame 54 permit K times as many exposures of the film as there are mirrors 55. The mirrors 55 give a change in azimuth to the reference beams, while motor 36 provides K changes in elevation angle for each of the reference beams from mirrors 55.

As will be further described in connection with FIG. 7, the plurality of mirrors 55 can be displaced by the use of a plurality of optical fibers 104. The separate fiber ends 105 can of course be mounted in a frame like 54 and elevated through a plurality of angles to provide additional reference beams.

In FIG. 1, I show how by the use of a plurality of mirrors 55 it is possible to direct the reference beam to the first surface of the record 30, from any of a plurality of discrete separate angles. In FIG. 7, I show another way to get the plurality of beams at different discrete angles. This involves a bundle of fiber optics 100. Part of the fibers 101 goes, with optics 102 to irradiate the subject 26 with rays 103. The other fibers are broken up into groups, each group 105a, 105b, 105c, etc., going to appropriate positions and directed along radii 107a, 107b, 107c, etc. Optics 106a, 106b, 106c, etc., are required to provide a beam of the desired cross section to irradiate the record 30. Of course, since all of the fibers 104 will be carrying light all of the time it is necessary to provide shutters or masks 108a, 108b, 108c, etc., to close off the light. Then by means (not shown), any one of the masks can be opened to pass light at that angle to the film. These shutters or masks can be small vanes attached to magnetic armatures or relays that can be operated by passing current through an associated magnetizing coil.

Figure 8:
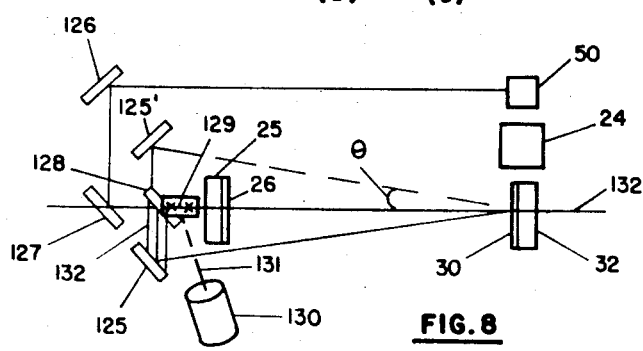
FIG. 8 shows an alternative embodiment to that of FIG. 1 in which the plurality of reference beams reach the hologram film at the same angle, but at different azimuths.

FIG. 8 illustrates in schematic form another embodiment of this invention, in which a plurality of positions of the reference beam relative to the hologram are provided by keeping the beam at the same angle with the perpendicular to the holographic record, but changing its azimuth. This is accomplished by a mirror 125 on arm 132 rotated about axis 129 by motor 130 through drive 131. Light from the laser beam 23 is carried to mirror 125 via mirrors 50, which is now fixed and not rotatable, 126, 127 and 128. Instead of rotating the arm 132 and mirror 125, a plurality of fixed mirrors like 125, can be mounted on a circular ring around axis 129 (coincident with the locus of mirror 125) and then simply rotating mirror 128 will carry light to each of the mirrors sequentially. By this means a plurality of images can be displayed in rapid succession. It will be clear that by suitably synchronizing motor 130 and drive 131 with the drive mechanism that moves film 94 (FIG. 6) then as the film is moved incrementally by distance 99, mirror 125 will move to a new reference beam position to correspond, and so on. I contemplate also, in connection with FIG. 8 having two or more sets of mirrors 125, 125' set at greater radius from the axis 132. When these are used, the angle $\theta$ will be greater than for the case illustrated. Thus a plurality of K sets of reference beams can be formed each having a different angle $\theta$ with the perpendicular to the film surface. Each set would have a plurality of reference beams each with constant angle $\theta$, but having a different one of a plurality of azimuth angle.

Another way to create a plurality of holograms on the record 30 is to use a plurality of coded reference beams. Such a coded reference beam is one that has a varied intensity of radiation over a cross section of the beam. This can be done as illustrated in FIG. 9. Here the holographic film 30, subject 26 and mirror 24 are the same as in FIG. 2. However, instead of using a beam of uniform intensity as the reference beam as in FIG. 2, I propose to back light a transparency 136 by mirrors 50 and 135, and by means of optics 137 illuminate the film 30. This reference beam, modified by the transparency 136 in the gate 136', plus the light from the subject 26, both arriving together at the film will make a hologram. The reconstruction of this hologram can only be accomplished by irradiating the developed hologram 30 with the identically same reference beam, which is the beam 138, 139 from the transparency 136. However, a second hologram can be recorded on the same film 30 (before development) by using a different beam 138, 139 derived from a differently coded transparency 136 and so on. The different transparencies can be mounted on a rotating disc or drum as is well known, or on a strip film such as 140 controlled by reels 141, 142 as is well known in the art.

By using a coded reference beam, the hologram can be reconstructed and the information read only by using the exact same reference beam in the exact same position. Thus the information on the hologram is completely private and cannot be read without having the precise coding mask that was used to record the hologram. This is a form of security storage, or scrambling of confidential information that is part of this invention.

It is well known that if coherent light illuminates two different subjects, and if the light scattered by the two subjects is made to overlap over the exposure area of a recording film, interference will occur and a hologram will be recorded. Now, if either *one* of the two subjects is illuminated by coherent light, and the scattered light again irradiates the hologram in the precise manner in which the hologram was recorded, there will be reconstructed (virtual and real) images of the *other* subject. Because of the fine detail in the light returned from the subjects to the film in recording, the reconstructing subject must be precisely positioned with respect to the hologram film.

The total number of points of light that can be recorded on the film 30 depends on the resolution of the film and the size of a diffraction pattern recorded on the film from a single point on the subject. The total number of such points of light is, in general, a very large number, so that many different holograms can be superimposed without serious loss of information due to overlapping of points. However, there will be spots from different holograms which are superimposed, and the double or triple exposure of such spots will introduce errors. For the case where the holograms represent pictorial subjects, whether from two dimensional or three dimensional subjects, these relatively few points of overlap are not likely to be troublesome. However, in the holographic recording of digital spot patterns where each spot or bit, is important, this overlapping of points may be troublesome. In preparing such digital holograms I propose to use spot pattern subjects as in FIG. 10 with appropriate guide indicia 151, 152, which are recorded in precise geometric relation to the matrix of rows 146, 147 and columns 148, 149, etc., if all of the subject cards 26 are prepared with the same matrix and guide indicia. Then by the use of motor 155 and screw feed 154, the subject card 145 can be traversed in steps, so that column of spots 156 of the matrix is successively placed at 157, 158, 159, etc. There may be as many positions as desired before the column 156 would be superimposed on the adjacent column of the matrix. The movement in horizontal traverse would be sensed by index 160.

In a similar way the card 145 can be traversed vertically in steps. Thus there are different matrix positions equal in number to twice the number of positions such as 157, 158, 159, etc., that can be occupied without overlapping spots on the hologram film. Of course, each different subject pattern will require a different card 145 or film frame 201 of FIG. 2a. However, by means of the guide indicia 151, 152, etc., sensors 160, 160' and appropriate servo means, each of the matrices can be accurately positioned with respect to the holographic film.

It will be clear that the precision of placement of the subject with respect to the holographic film is most important when the subject consists of a pattern of spots, each of which is an item of information. Generally, a spot scanner will be placed at the viewing point 78 and it is desirable that the spot matrix be positioned accurately with respect to the scanner. If the subject is a pattern of spots it can be read by a scanner that reads each spot sequentially, or it can be read by a matrix of photocells in the same pattern as the spots. This is shown in my U.S. Pats. 3,322,030 and 3,322,033.

The subject can be positioned directly with respect to the holographic film, or it can be positioned with respect to the subject mounting means, and the subject mounting means positioned with respect to the hologram positioning means, and the hologram film positioned with respect to the hologram positioning means.

I show in FIG. 11 how a subject record (as in FIG. 10) containing a matrix of spots and guide indicia can be precisely positioned with respect to a remote frame of reference. This could be the hologram positioning means, for example. Assume that the subject record is of the form of card 145 containing a matrix of spots and longitudinal and transverse guide indicia. The indicia can be lines of spots, as shown, or continuous lines, etc.

The card 145 is imaged onto the frame 175 (which might hold a hologram film 176). There are two optical systems 177, 178 placed in such a position with respect to the frame and film, that when the matrix of card 145 is precisely positioned on the film 176 the guide indicia 152 and 151 will be precisely centered over the prisms 179, etc. Thus, half of the light transmitted through the translucent guides 152, for example, will fall on each side of prism 179 and each half will be reflected to the photoelectric sensors 180, 181. The outputs of these sensors go to servo amplifier 184 of conventional design and leads 185 to motor 155'. If the light falling on each sensor 180, 181 is the same, then there is no signal to the motor. If, because the matrix is not positioned properly over the film, the light is not balanced on the sensors 180, 181, then an appropriate signal will go from the amplifier 184 to the motor 155', which will drive screw 154' to move the card 145 up or down (as required) to balance the light on the sensors. When it is balanced, the matrix is in proper position in a vertical direction. A similar set of prisms, sensors, amplifier, etc., in conjunction with motor 155 will serve to position the card transversely.

By this means, the subject records can be precisely positioned with respect to the hologram mounting means. In a similar way, the reference beam code masks 136, of FIG. 9, having patterns of spots and guide indicia can be positioned with respect to the hologram positioning means. Also, if the hologram film, when first positioned in the hologram positioning means has recorded on it a pattern of guide indicia, then after development, these indicia, by means such as shown schematically in FIG. 11, can be used to position the developed hologram with respect to the hologram positioning means. Thus all three interacting elements: subject card, reference beam mask means, and holographic film can be separately and accurately positioned with respect to the hologram positioning means, and therefore with respect to each other.

Having positioned the subject card 145 to the proper position with respect to the frame 175 it is possible to disconnect the servo amplifier and by means such as motor 192, drive 191 and differential gear 190 to insert an incremental displacement of the card corresponding to position 157, for example.

To facilitate the precise placement of the subject spot pattern I propose to record on the subject card, guide indicia to facilitate the placement of the subject pattern with respect to the holograph positioning means and the holographic film. These indicia will not only facilitate the placement of the subject card or film strip frame, but in the reconstruction it will facilitate the positioning of the scanner with respect to the pattern of spots.

I show in FIG. 10 a pattern of spots on the subject card 145, with a corresponding array of guide indicia. Also, in FIG. 9 I show that the reference beam 138, 139 can be modified or coded by transmission through a transparency or mask 136, or the like. Since it will be important in the reconstruction to generate the precise same reference beam at the same position on the hologram, I propose that each of the frames of the coding transparency 136 have guide indicia recorded thereon so that, by means such as shown in FIGS. 10 and 11, the coding pattern on 136 can be placed in the precisely same position. I also contemplate recording such indicia on the hologram record 30, so that after development, it can be accurately repositioned in the hologram positioning means of the reconstruction apparatus.

In summary, I contemplate the use of guide indicia on the subject records, and appropriate servo means, responsive to the guide indicia to precisely position the subject pattern record 145 or transparency 136. Also, I contemplate placing guide indicia on the code modifying means such as 136 and means to accurately position the code modifying means so as to accurately direct the coded reference beam. Also the hologram film itself, will have guide indicia recorded, so that after being multiple-exposed and developed it can be repositioned in the reconstruction apparatus to its precise proper position.

I have spoken almost interchangeably of using the apparatus of FIGS. 1 and 2 for example, both for recording the hologram, and for reading out or reconstructing its multiple images. Such apparatus is ideally used for both of these operations. For normal viewing of pictorial images, the precise positioning of the subject and the holographic film is not too important. However, for scanning the images of a pattern of spots subject, it is desirable to have the subject and hologram precisely positioned with respect to each other and with respect to the scanner. The guide indicia recorded on the subject and the hologram will facilitate this precise positioning. Also, to reconstruct a hologram prepared with a coded reference beam, the beam must be precisely positioned with respect to the hologram. Here again, the use of guide indicia on the coding mask will be useful.

In the event that a second display apparatus is used to reconstruct an image recorded in a first apparatus, means must be provided to align and direct the various optical elements so that those of the second apparatus are congruent with those of the first apparatus. Thereafter the guide indicia will provide the means to accurately align each of the separate cards, masks and records. In the process of alignment the use of standard cards or films with guide indicia will be helpful.

It is apparent that it is not possible to set out all of the modifications which can be employed using this information system. It is to be understood that the invention is not limited to the embodiments shown or discussed, but only by the appended claims.

I claim:

1. In an information system comprising:
   (a) a web of radiation-sensitive record medium positioned in a hologram positioning means,
   (b) means for sequentially and selectively positioning a plurality of subjects in front of said positioning means on a subject line at a first predetermined angle to said web record, said subjects adapted to redirect radiation impinging on their surfaces, to said record medium in said positioning means, said redirected energy comprising subject beams, a different beam for each of said subjects,
   (c) means for sequentially selecting one of a plurality of reference beams, each of said reference beams having at least one parameter different from those of each of the other of said reference beams, said parameter being effective in recording and reconstructing holograms,
   (d) a source of coherent radiation and means to simultaneously direct said radiation to said selected subject and to said selected reference beam, whereby said web record will be simultaneously irradiated with said selected subject beam and said selected reference beam, the improvement comprising:
   (e) said hologram positioning means having an exposure area of longitudinal dimension D,
   (f) means for incrementally moving said web record in said positioning means by distances of dimension $d$, where $d=D/K$, where K has a magnitude of at least the value 2, and
   (g) means, responsive to said means for incrementally moving said web record, for controlling said means for selecting one of said plurality of reference beams, whereby as said web is moved longitudinally in said exposure area, each time said web moves a distance $d$, a new reference beam is selected.

2. The system as in claim 1 including means to process said web record to form a hologram record and to position said hologram in said hologram positioning means, and means to irradiate said hologram in said exposure area by said selected reference beam alone, whereby an image is reconstructed, the selection of said reference beam being responsive to the incremental movement of said hologram.

3. The system as in claim 2 including means to utilize said reconstructed image.

4. Apparatus as in claim 3 in which said means to utilize said reconstructed image includes electrooptical scanning means to read the information in said reconstructed images.

5. Apparatus as in claim 1 in which said plurality of reference beams are formed by a plurality of optical elements arranged to direct said reference beams so as to intersect said exposure area at different predetermined angular relations.

6. Apparatus as in claim 5 in which said predetermined angular relations comprise fixed angles at different azimuths.

7. Apparatus as in claim 1 in which said plurality of reference beams are formed by a plurality of optical elements arranged in a plane so as to direct said reference beams to intersect said first surface at different predetermined angles within said plane, and including means to vary the angle of said plane with respect to said first surface.

8. Apparatus as in claim 1 in which said plurality of reference beams are formed by means including a plurality of optical fibers all of said fibers receiving their radiation from the same source of coherent radiation.

9. Apparatus as in claim 1 including means to direct said radiation to the portion of said subject turned away from said record medium.

10. Apparatus as in claim 1 in which said plurality of reference beams comprise a beam of coherent radiation fixed in direction with respect to said record medium and coded with a plurality of differene patterns of intensity of radiation to form said plurality of reference beams.

11. Apparatus as in claim 10 in which said reference beams are coded optically by means of a plurality of reference beam coding masks each carrying a different pattern of masking areas, and carrying also, guide indicia recorded on said coding masks in precise geometric relation to said patterns, and means responsive to said guide indicia on said coding masks to precisely relatively position said coding masks and said hologram.

12. Apparatus as in claim 11 in which the reference beam coding masks are transparencies and are backlighted.

13. Apparatus as in claim 1 in which said plurality of reference beams comprise beams having uniform intensity but different angles with said record, and said means for changing includes means for changing the direction of said beams.

14. Apparatus as in claim 1 in which said plurality of reference beams include beams having a fixed direction but a nonuniform intensity coded by means of a reference beam coding mask and said means for selecting includes means for changing masks responsive to the incremental motion of said record medium.

15. An information system comprising:
(a) support means,
(b) means for positioning on said support means a radiation-sensitive web record medium in a hologram positioning means, said positioning means having an exposure area of longitudinal dimension D,
(c) means for incrementally longitudinally moving said web record in said positioning means by distances of dimension $d$, where $d=D/K$ where K is of magnitude at least 2,
(d) means for sequentially positioning a plurality of primary subjects in front of said positioning means on a primary subject line at a first predetermined angle to said web record, said primary subjects adapted to redirect radiation impinging on their surfaces to said exposure area, said redirected radiation comprising primary subject beams,
(e) means to sequentially position a plurality of secondary subjects in front of said positioning means on a secondary subject line at a second predetermined angle to said web record, said secondary subjects adapted to redirect energy impinging on their surfaces to said exposure area, said redirected energy comprising secondary subject beams, said means to sequentially position said secondary subjects being responsive to said incremental motion of said web record, whereby with each incremental movement of said web record a different secondary subject is positioned on said secondary subject line, and
(f) a source of coherent radiation and means for directing said radiation simultaneously to said primary and to said secondary subjects, whereby said exposure area will be simultaneously irradiated by primary and secondary subject beams.

16. The information system as in claim 15 including means to impress positioning indicia on said secondary subjects and means including servo means responsive to said positioning indicia to precisely relatively position said secondary subjects and said web record.

17. The information system as in claim 15 in which said secondary subjects are transparencies.

18. The method of making a multiple exposure holographic information record, comprising the steps of:
(a) placing a first subject at a first position along a subject line making a predetermined angle to the first surface of a web of radiation-sensitive record medium in a hologram positioning means, said positioning means exposing an exposure area of said first surface of said web of longitudinal dimension D,
(b) irradiating said first subject with a first beam of coherent radiation, whereby a portion of said radiation is redirected to said exposure area,
(c) simultaneously irradiating said exposure area of said web with a first reference beam of coherent radiation derived from the same radiation source as said first beam,
(d) incrementally moving said web medium in a longitudinal direction a distance $d$, where $d=D/K$ where K has a value of at least 2,
(e) replacing said first subject with a second subject at a second position on said subject line,
(f) changing at least one parameter of said first reference beam to form a second reference beam, said parameter being effective in producing and reconstructing holograms, the change from said first reference beam to said second reference beam being responsive to said incremental movement of said web, and
(g) irradiating said second subject with said first beam of coherent radiation, while
(h) simultaneously irradiating said exposure area with said second reference beam.

19. The method as in claim 18 including the additional step, after step (c), and before step (d) of marking positioning indicia on said web record, said indicia being capable, in conjunction with servo means, to precisely reposition said web in each of its plurality of positions at the times of exposures.

References Cited
UNITED STATES PATENTS
3,266,393   8/1966   Chitayat   95—1.1
3,364,497   1/1968   MacAdam   350—162X

OTHER REFERENCES

Supertzi et al.: "Wide-Angle Holography," 56 J. Opt. Soc'y Am. 524–525 (April 1966).

Archbold et al.: Nature, vol. 217, p. 942 (March 1968).

Caulfield et al.: Applied Optics, vol. 6, No. 7, p. 1272 (1967).

Erdos: IBM Tech. Discl. Bulletin, vol. 9, No. 3, p. 291 (August 1966).

Leith et al.: J. Opt. Soc. Am., vol. 56, No. 4, p. 523 (April 1966).

Marom et al.: App. Phys. Letters, vol. 12, No. 2, pp. 26–28 (January 1968).

McCrickerd et al.: App. Phys. Letters, vol. 12, No. 1, pp. 10–12 (January 1968).

Paques: Acad. Sc. Paris, 260:6562–6564 (June 1965).

DAVID SCHONBERG, Primary Examiner

R. L. SHERMAN, Assistant Examiner

U.S. Cl. X.R.

352—85